Nov. 10, 1970 D. R. VON RECKLINGHAUSEN 3,539,729

APPARATUS FOR REDUCING INTERFERENCE IN THE TRANSMISSION OF ELECTRIC SIGNALS

Filed June 12, 1967 2 Sheets-Sheet 1

INVENTOR
DANIEL R. vonRECKLINGHAUSEN

BY Rines and Rines
ATTORNEYS

Nov. 10, 1970 D. R. VON RECKLINGHAUSEN 3,539,729

APPARATUS FOR REDUCING INTERFERENCE IN THE TRANSMISSION OF ELECTRIC SIGNALS

Filed June 12, 1967 2 Sheets-Sheet 2

INVENTOR
DANIEL R. vonRECKLINGHAUSEN

BY Rines and Rines

ATTORNEYS 3,539,729
Patented Nov. 10, 1970

3,539,729

APPARATUS FOR REDUCING INTERFERENCE IN THE TRANSMISSION OF ELECTRIC SIGNALS

Daniel R. von Recklinghausen, Arlington, Mass., assignor to H. H. Scott Inc., Maynard, Mass., a corporation of Massachusetts Filed June 12, 1967, Ser. No. 645,860
Int. Cl. H04h 5/00
U.S. Cl. 179—15 11 Claims

ABSTRACT OF THE DISCLOSURE

The invention provides attenuating networks that automatically reduce interference accompanying the reception and reproduction of signals such as stereo transmissions. In a stereo operation this is accomplished by first obtaining two isolated signals from each channel, summing an isolated signal from one channel with a corresponding isolated signal in the other channel, and further using this sum which is absent a substantial portion of rumble and related noise to obtain a control signal for operating attenuating networks which act on the two remaining isolated signals (one in each channel).

Figure 1:
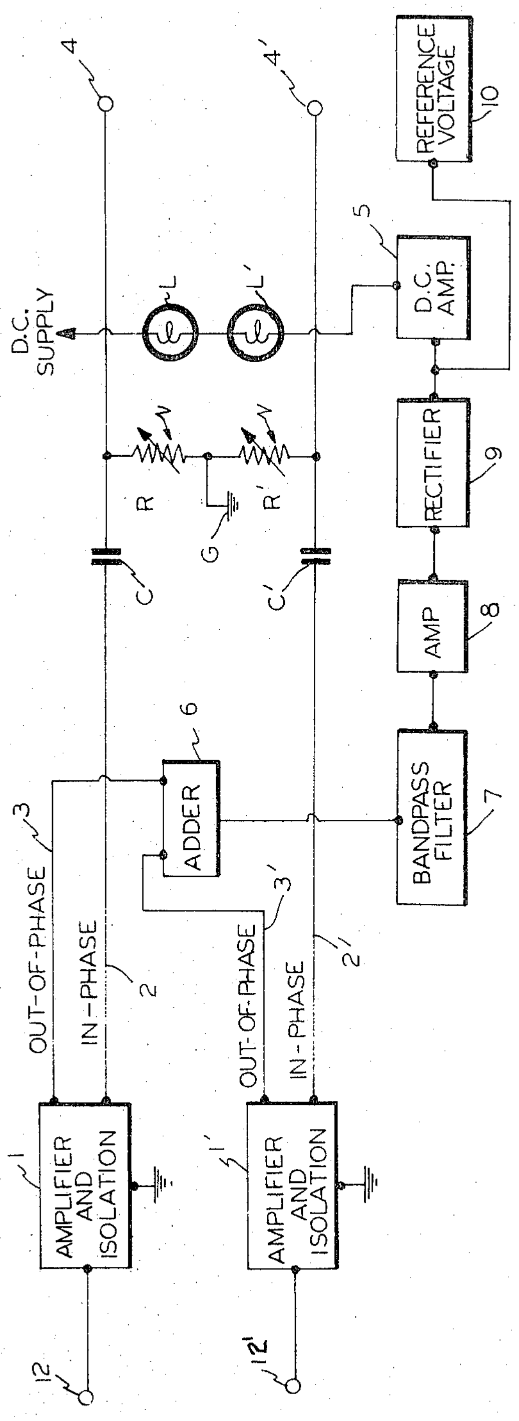

The present invention relates to apparatus for reducing noise and related interference in electric signals and in particular to automatically controlled filters adapted for enabling the transmission of audio-frequency and other signals, such as, for example, speech and music, in the presence of background noise, interference and other spurious signals.

For many years, audio noise-reducing (or suppressing) circuits which automatically restrict the frequency range of transmission in the absence of a desired signal have been used in order to improve the apparent signal-to-noise ratio of the system as ultimately determined by listening to the acoustic output of the system after conversion from electric to audible signals. Such circuits are described, for example, in U.S. Letters Patent No. 2,606,971, issued Aug. 12, 1952 to Hermon H. Scott. Customarily, a single transmission path has been involved where both the desired signal and interference exist simultaneously in the same transmission channel, at a single pair of input terminals.

The increased popularity of long-playing stereophonic recordings and their transmission over stereophonic broadcast transmitters for reception by receivers adapted for reception of these stereophonic signals has given rise to the consideration of such apparatus for two or more channels of transmission. In the case of stereophonic phonograph records of the two-channel type, it has been found that the equivalent electric signals corresponding to desired modulation by speech and music, are substantially correlated between the two channels; that is, the two envelopes of the two signals show a very high degree of correlation because the two sets of microphones receiving the signals from the same acoustic source, such as an orchestra, receive comparable sound intensities during any short time interval. This correlation between the two signals is still fairly high, but not quite so great, for the instantaneous values of the two signals, being on the average of the order of 50% for ochestral music. This means that the two signals are in phase approximately 75% of the time.

The interference components observed in such two signal paths exist primarily as a result of three broad causes. Low-frequency interference is primarily due to mechanical vibartions of the phonograph turntable mechanism, and, to a smaller degree, to the recording mechanism and the record itself. These spurious low-frequency signals, translated by a phonograph pickup from these mechanical vibrations, result primarily in interference signals which are out-of-phase in the two channels because this vibration is primarily in the vertical direction. High-frequency interference components, on the other hand, are primarily due to surface imperfections of the record itself, tape hiss in the original master recordings, and electronic circuit noise. Since such noise components are randomly generated, they show extremely little correlation between the two channels. The third major source of interference is acoustic noise present in the inputs of the two sets of microphones and may or may not be correlated between the two channels depending upon the type and source of this noise. This acoustic noise exists primarily at medium to high frequencies and is often considered to be a portion of the desired signal by some listeners.

While the attenuation of these various interference components could be attained by prior art circuits, such as those described in said Letters Patent, adapted for use in a single channel by employing a separate and independent suppressor circuit for use with each channel, an object of the present invention is to make use of the discovered relative correlation of desired signal and interference components before mentioned, employing the sum of the signals in the two channels of operation as a means for controlling circuit operation after suitable filtering and processing, and to have the attenuating means operate independently in each channel of transmission.

As an alternative mode of operation, in accordance with the objectives of the invention, a portion of the attenuating means can be used to attenuate the difference component between the two channels of operation, thereby taking advantage of the fact that the desired signal is primarily an in-phase or sum signal, whereas the low-frequency interference is primarily an out-of-phase or difference component.

In the transmission of stereophonic signals with FM transmitters, according to the Rules and Regulations of the Federal Communications Commission, a main-channel signal corresponding to the sum of the two input channels is transmitted as a frequency-modulated signal and the difference between the two channels is transmitted as a frequency-modulated double-sideband suppressed-carrier signal of supersonic frequency. These supersonic difference components are more subject to noise and interference, typically having a signal-to-noise ratio poorer by as much as 23 decibels than the main channels for sum components. Consequently, attenuating the difference component in the absence of desired sum modulation constitutes a further improvement attainable with the invention.

Circuits heretofore used for the attenuation of interference components, and most specifically automatic circuits, have involved the use of reactance tubes and the like connected in shunt with the signal path. The attenuation experienced was a direct function of the gain and transconductance of the particular tube used, the gain being varied, in turn, by a direct-current control signal. In order to have a reasonably rapid variation in attenuation as a function of time, the direct-current control signal had to contain a number of subsonic, and even low-frequency audio signals. The control signal amplified by the reactance tube appeared, of course, as a corresponding voltage variation on the plate terminals giving rise to low-frequency transients in the signal circuit. In order to overcome these transients, a high-pass filter adjusted to cut off at the lowest audible frequency (i.e., 20 c.p.s.) had to be used in the output circuit, and the speed of operation of the filter had to be restricted so as to avoid control signal transients above that cut-off frequency. Another disadvantage of such prior circuits resided in the fact that the required change in gain of these tubes necessitated operation in a somewhat non-linear region of amplification, thereby giving rise to distortion components introduced into the signal circuit by the automatic filter. These distortion components were generally minimized by restricting the maximum permissible value of the signal components.

A further object of the present invention, however, is to overcome the aforementioned particular disadvantages associated with reactance tubes, and the like and to avoid the need for high-pass filters while minimizing the generated distortion. An additional object of the invention, moreover, is to provide for selection of the speed of operation without regard for the lowest frequency of operation of the signal path.

Still another object is to provide novel high-pass variable filter circuit.

An additional object is to provide for variation of passive elements in high-pass filters and the like for use as noise and related interference suppressors in signal paths wherein such variation is effected without introducing D.C. control voltages in the signal path, unlike circuits of the type described in said Letters Patent.

Other and further objects will be explained hereinafter and are more particularly delineated in the appended claims.

Figure 3:
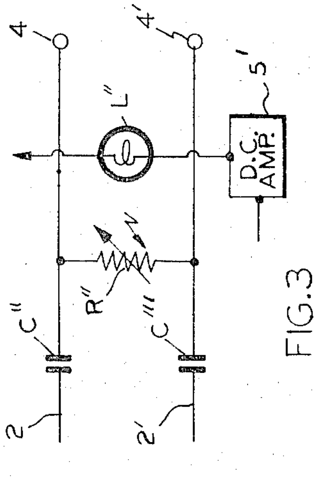
Figure 2:
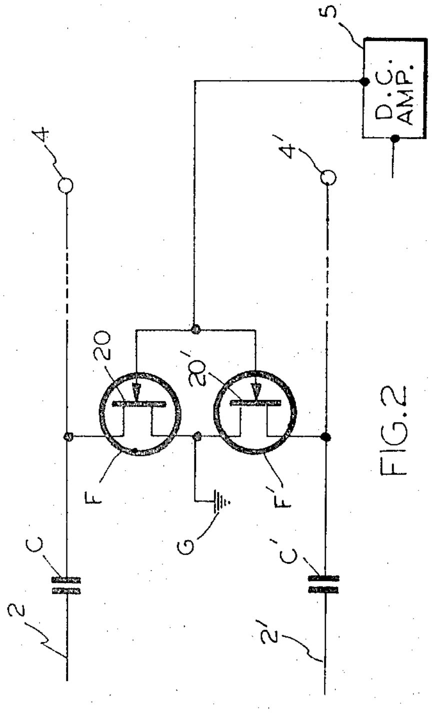
Figure 4:
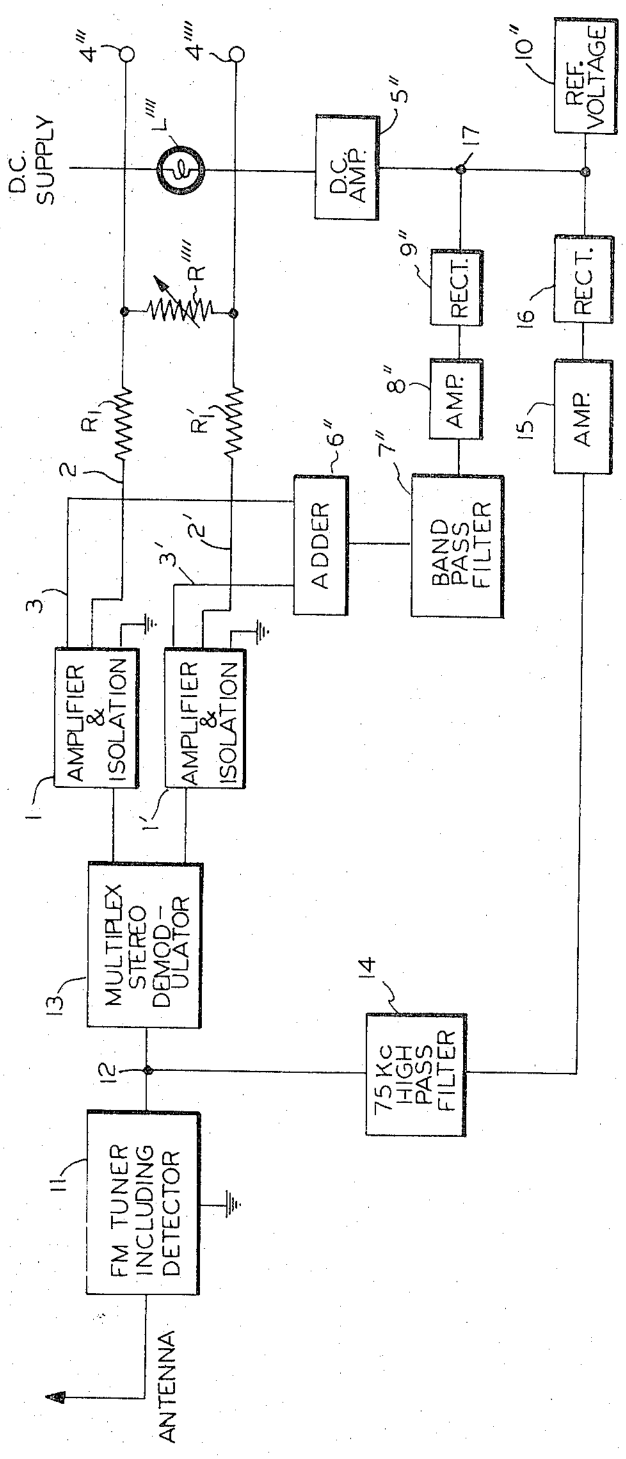

The invention will now be described with reference to the accompanying drawings, FIG. 1 of which is a combined schematic circuit and block diagram illustrating a preferred embodiment and illustratively shown as adapted for phonograph-record reproducing mechanisms;

FIGS. 2 and 3 are fragmentary circuit modifications of portions of the circuit of FIG. 1; and FIG. 4 is a diagram similar to FIG. 1 of a circuit particularly adapted for the radio reception of stereophonic broadcasts.

In summary, from one of its aspects, the invention reduces interference accompanying signals fed along a pair of signal paths and which is out-of-phase, and includes, in combination, network means comprising variable resistance means connected across the pair of signal paths (such as stereophonic channels), direct-current control circuit means, means for varying the resistance of the variable resistance means and thus the attenuating characteristics of the network means in response to variations in the direct-current control circuit means, means for adding components of the signals fed along the pair of signal paths, such that a substantial portion of said interference is absent from a signal representing their summation (such as a substantial portion of rumble interference that is absent from the sum of stereophonic signals), and means for controlling the direct-current control circuit means in accordance with the added signal components. Preferred circuit details and novel subcombination features are hereinafter set forth.

Referring to FIG. 1, the input signal of two stereophonic channels, as above described, is fed at terminals 12 and 12′ to two phase-inverting and isolation amplifiers 1 and 1′, each providing an "in-phase" signal on respective signal-path conductors 2 and 2′ and "out-of-phase" signals (not necessarily of the same magnitude) along signal-path conductors 3 and 3′. The terms "in-phase" and "out-of-phase" referring to the phase of the output of the amplifier relative to the input.

The in-phase signals are respectively fed to output terminals 4 and 4′ through coupling capacitors C and C′. In shunt with the output terminals 4 and 4′ variable resistors R and R′ are connected which, together with series-connected capacitors C and C′, comprise two variable high-pass network filters, the junction between resistors R and R′ being shown grounded at G. Resistors R and R′ are preferably identical and can, for example, assume the form of field-effect transistors (operated at any D.C. supply voltage, including zero volts), as later described in connection with the embodiment of FIG. 2, or light-dependent resistors in separate or in a common light-tight enclosure, illuminated by one or two light sources L and L′. In order to control the ohmic value of these variable resistances R and R′, so that they may serve their function in the variable high-pass network filters R–C, R–C′, a common control current is applied to light sources L and L′, supplied by D.C. amplifier 5.

A stereophonic signal, as obtained, for example, from playing a stereophonic record, has related signals in the left and right channels, the sum of which corresponds to lateral modulation on the record, and the difference to vertical modulation. Because of finite microphone separation, recorded signals in the left and right channels are closely related in amplitude and are related in phase at low frequencies, such that the sum of the two signals may be used as a means of control. The mechanical vibrations of phonograph turntables and record changers is primarily vertical, and to a lesser degree in a lateral direction so that the majority of the rumble signal does not enter a control circuit made sensitive to the sum signal.

Such a sum signal is obtained in a conventional summing or adder circuit 6 having as its inputs the two out-of-phase signals on conductors 3 and 3′. The output of the adding circuit 6 is filtered by bandpass filter 7 to further discriminate against interfering very low-frequency rumble signals and against high-frequency music and speech signals, whose presence does not require extended low-frequency response of the music reproducing system. Primarily, the low-frequency music signal is passed by bandpass filter 7 and is further amplifier by amplifier 8, being then rectified by rectifier 9 and added to a reference voltage 10 to provide a DC input to the DC amplifier 5.

To suppress the interference rumble signals in the absence of a music signal, it is required to have the cutoff frequency of high-pass filter networks R–C and R′–C′ at a higher frequency than when a low-frequency music signal is present. Since photoconductive resistors R and R′ have a low resistance with high illumination and a high resistance in the absence of light, the reference bias voltage 10 acting on lamps L and L′ by way of DC amplifier 5 will cause the resistors R and R′ to assume a low resistance value. The rectified signal voltage obtained from rectifier 9 is of polarity opposite to the reference voltage and thereby causes resistances R and R′ to assume a high value, thereby lowering the cutoff frequency of network filters R–C and R′–C′ so that the low-frequency music signal may pass to the output terminals 4 and 4′ with reduced attenuation.

Field effect transistors have a minimum dynamic resistance with zero bias and a high resistance with reverse bias applied to their gate electrode, as measured between their source and drain electrode terminals. They can accordingly be used in the same circuit connection as resistors R and R′ with the output of the DC amplifier 5 connected to the gate terminals 20, 20′ of field effect transistors F and F′, as shown in FIG. 2.

As mentioned above, the primary incidental vibration of phonograph turntables and record changers is in a vertical direction, thereby creating an interference signal which is out-of-phase in the two channels, and can therefore be regarded as a push-pull interference component. In order selectively to attenuate this component, a single variable resistor R″ may be connected across the two non-grounded output terminals 4 and 4′, as shown in FIG. 3. In the case of a photo-sensitive resistor R″, only a single light source L″ operated by a DC amplifier 5′ is then required.

This circuit of FIG. 3, moreover, with its separate DC amplifier and reference voltage source can also be connected in series with the circuit shown in FIG. 1 to provide a greater attenuation for the push-pull or out-of-phase interference component than for the interference components existing separately in the two channels. As an alternative, the additional variable resistor R″ may again be connected in series with terminals 4 and 4′ by way of capacitors C″ and C‴, but its light source L″ may be connected in series between the DC supply and the other light sources L and L′ of FIG. 1, thereby establishing common control and yet providing increased attenuation for the out-of-phase low-frequency interference components than for the interference components existing separately in the two channels.

For the reception of stereophonic broadcasts, as distinguished from the stereophonic phonograph record or the like described in connection with the embodiment of FIG. 1, a similar method of interference reduction may be applied. This is illustrated in FIG. 4 wherein an antenna, so-labelled, connected to FM tuner 11, comprises the original signal source. The detector of this tuner provides all audio-frequency and supersonic signals at its output terminal 12, as is well-known. Connected to terminal 12 is also a multiplex stereophonic demodulator apparatus 13 of the type, for example, described in United States Letters Patent No. 3,175,040, issued to the applicant Von Recklinghausen, providing left and right channel output signals connected to the same amplifiers 1 and 1′ as in FIG. 1. Again, these amplifiers have in-phase and out-of-phase output conductors 2, 2′ and 3, 3′. The signal flow from conductors 3 and 3′ finally ending up as a control current for light source L′′′′, is the same as in FIG. 1, except that adder circuit 6″, bandpass filter 7″, amplifier 8″, rectifier 9″, and DC amplifier 5″ are used. By the nature of the desired signal, it is preferable that bandpass filter 7″ pass a greater frequency range than bandpass filter 7 in FIG. 1 so that any monophonic signal component appearing at the output 12 of the FM tuner 11 will reduce the current flowing through light source L′′′′, and accordingly increase the ohmic value of resistor R′′′′ which is connected across the two non-grounded output terminals 4′′′ and 4′′′′. In series with amplifier outputs 2 and 2′ are connected resistors R1 and R1′ which, in turn, feed the two stereophonic signals to output terminals 4′′′ and 4′′′′. Any finite value of resistance of resistor R′′′′ will therefore reduce the push-pull component of both the stereophonic signals and the interference components. As mentioned above, the sub-channel of a stereophoic broadcast being transmitted on a relatively high sub-carrier frequency is more subject to interference than the sum of main channel audio frequency components such that the interference components at the outputs of the multiplex stereo demodulator 13 are primarily in push-pull and therefore attenuated by variable resistor R′′′′.

Up to this point the operation of the circuit of FIG. 4 is substantially identical to the operation of the circuit of FIG. 1, as modified with the addition of the further light-sensitive resistor as taught in FIG. 3, with the exception that the attenuation of push-pull interference components is made essentially nonfrequency sensitive. The interference present in the difference channel or subsidiary channel of a multiplex stereo broadcast, however, is strongly dependent upon available signal-to-noise ratio at the antenna terminals of the FM tuner, and therefore a further automatic control circuit is used to provide for additional control depending upon available signal-to-noise ratio. Since the output of an FM tuner, including its detector, is essentially dependent only upon modulation of the broadcast transmitter and essentially independent of signal strength, the amount of output noise available at the output terminal 12 of FM tuner 11 is a good measure of the inverse of the available signal-to-noise ratio of the subsidiary difference channel.

In order to provide for this additional automatic control, the output 12 of the FM tuner 11 is accordingly connected to a further high-pass filter 14, which passes all frequencies above the highest modulation frequency of the original transmitter (75 kc.). The output of this high-pass filter 14, therefore, contains primarily noise which is in proportion to the noise existing in push-pull fashion at the two sets of output terminals of the multiplex stereo demodulator 13. The output of filter 14 is further amplified in amplifier 15 which, in turn, is connected to rectifier 16. Rectifier 16 is connected in opposite polarity to that of rectifier 9″ so that any input signal to rectifier 16 will provide at the common terminal 17 between them, a direct-current component in opposition to that obtained from rectifier 9″. This will cause light source L′′′′ to be illuminated more by way of DC amplifier 5″ and, in turn, causes resistor R′′′′ to assume a low ohmic value which will cause a substantial attenuation of the signal components existing in push-pull fashion along conductors 2 and 2′.

Any increase in signal strength will cause a reduced noise output at terminal 12 that effects a reduced amount of signal reaching rectifier 16 and reduced illumination of light source L′′′′, and thus a reduced attenuation of the difference channel push-pull component.

Also connected to terminal 17 is a reference voltage source 10″, the adjustment of which can be used to proportion the amount of maximum interference suppression desired.

By the decrease in resistance of variable resistor R′′′′ due to noise components and the increase in resistance of resistor R′′′′ due to desired signal components, the circuit of FIG. 4 has been provided with the facility to establish an essentially constant minimum signal-to-noise ratio at its output terminals 4′′′ and 4′′′′.

It is not intended to restrict the application of these circuits and systems for the reception of stereophonic FM broadcasts or the reproduction of phonograph records, this being but illustrative; the invention having much broader applications wherever there is a need for controlling signal-to-noise ratio as a function of signal and/or noise. Further modifications will also occur to those skilled in the art and all such are considered to fall within the spirit and scope of the invention as defined in the appended claims.

What is claimed is:

1. Apparatus for reducing interference accompanying signals fed along a pair of signal paths and in which the interference fed along said paths, respectively, is out-of-phase, that comprises, network means comprising variable resistance means connected across said paths, direct-current control circuit means, means for varying the resistance of the variable resistance means and thus the attenuating characteristics of the network means in response to variations in the direct-current control circuit means, means for adding components of the signals fed along the pair of signal paths, and means for controlling the direct-current control circuit means in accordance with the added signal components.

2. Apparatus as claimed in claim 1 and in which said variable resistance means comprises illumination-sensitive means the resistance of which varies with level of illumination, and the said resistance-varying means comprises illuminable means connected and responsive to the direct-current control circuit means and positioned to illuminate the variable resistance means.

3. Apparatus as claimed in claim 2 and in which said network means comprise a pair of resistance-capacitance high-pass filter networks each having capacitance connected in series with the corresponding signal path and an illumination-sensitive variable resistance element connected in shunt, the frequency cutoff characteristics of said networks being changed in response to variations in the resistance of the resistance elements.

4. Apparatus as claimed in claim 2 and in which said network means comprises a pair of resistance elements connected in series with the corresponding signal path and the illumination-sensitive variable resistance means connected therebetween.

5. Apparatus as claimed in claim 2 and in which said network means comprises a pair of capacitance elements connected in series with the corresponding signal path and the illumination-sensitive variable resistance means connected therebetween.

6. Apparatus as claimed in claim 1 and in which said signals comprise stereophonic signals and said pair of signal paths comprise a pair of stereophonic signal channels, each channel path being provided with phase-inverting amplifier means for producing oppositely phased signal components, the components of one phase being fed further along said channel paths and the components of the other phase being fed to said adding means.

7. Apparatus as claimed in claim 6 and in which the controlling means comprises bandpass filter and rectifying means connected between the adding means and the direct-current control circuit.

8. Apparatus as claimed in claim 7 and in which the said stereophonic signals are received in a frequency-modulation tuner and there is provided high-pass filter and further rectifying means connected between said tuner and said direct-current control circuit means further to control the latter in accordance with the level of interference at the output of the said tuner.

9. Apparatus as claimed in claim 1 and in which said variable resistance means comprises field effect transistor means having drain, source and gate electrode means and connected with the drain and source electrode means across said signal paths and said gate electrode means connected to the direct-current control circuit.

10. Apparatus for reducing low-frequency interference accompanying stereophonic channel signals fed along a pair of signal channel paths respectively that comprises means for separating each of said pair of signals into two isolated components, variable attenuating means connected in each channel path the control the transmission of one component of the associated signal therealong, means for summing the other components and means connected to said summing means for varying the attenuating means in response to the summation of the other components.

11. Apparatus as claimed in claim 10 and in which the said stereophonic signals correspond to sum and difference signals of the channels, means being further provided connected with said attenuating means for relatively attenuating the difference signal.

No references cited.

KATHLEEN H. CLAFFY, Primary Examiner

T. J. D'AMICO, Assistant Examiner